United States Patent [19]

Eskeli

[11] 3,949,557

[45] Apr. 13, 1976

[54] TURBINE

[76] Inventor: Michael Eskeli, 7994-41 Locke Lee, Houston, Tex. 77042

[22] Filed: Apr. 9, 1975

[21] Appl. No.: 566,373

Related U.S. Application Data

[63] Continuation-in-part of Ser. No. 405,628, Oct. 11, 1973, abandoned.

[52] U.S. Cl. .................................. 60/682; 60/721
[51] Int. Cl.² ........................................ F01K 25/02
[58] Field of Search ............ 60/643, 645, 650, 682, 60/721

[56] References Cited
UNITED STATES PATENTS

| | | | |
|---|---|---|---|
| 3,293,850 | 12/1966 | Morrison | 60/650 X |
| 3,303,646 | 2/1967 | Southam | 60/643 X |
| 3,715,887 | 2/1973 | Weatherly et al. | 60/650 |
| 3,861,148 | 1/1975 | Bailey et al. | 60/682 X |

Primary Examiner—Martin P. Schwadron
Assistant Examiner—H. Burks, Sr.

[57] ABSTRACT

A method and apparatus for generating power by compressing and expanding a first fluid in inward and outward extending first fluid passages within a centrifuge type rotating rotor. In a closed form of the turbine, heat is supplied to the first fluid by circulating a second fluid in a heat exchanger within the rotor, and heat is removed from the first fluid by circulating a third fluid through another heat exchanger. A regenerator type heat exchanger is provided for removing heat from the first fluid during compression and adding heat into said first fluid during expansion; thus, heat is taken from one stream of the first fluid and the same heat is added into another stream of the first fluid within the rotor. Alternately, two rotors may be used, with a second rotor serving as the power output rotor. Also, in an open form, the cooling heat exchanger may be deleted, with the first fluid entering from outside of the rotor and being discharged to outside said rotor.

3 Claims, 5 Drawing Figures

TURBINE

CROSS REFERENCES TO RELATED APPLICATIONS

This application is a continuation-in-part of "Turbine with Dual Rotors", filed 10/11/73, Ser. No. 405,628, now abandoned.

BACKGROUND OF THE INVENTION

This invention relates generally to devices for generating power in response to a fluid being flowed from a higher energy level to a lower energy level by passing said fluid through a turbine to generate said power.

There have been various types of turbines previously, in some of which a fluid is accelerated in a single or multiple stationary nozzles and then passed to vanes mounted on a rotating rotor wheel, where the kinetic energy contained by said moving fluid is converted to power. These conventional turbines normally have a low thermal efficiency.

SUMMARY OF THE INVENTION

It is an object of this invention to provide a turbine with a high thermal efficiency by exchanging heat between different streams of the working fluid, which herein is called the first fluid, so as to provide heat addition to said first fluid during expansion, and heat removal during compression. This is done in a working fluid heat exchanger mounted within the turbine rotor. In addition, heat may be added into said first fluid from a second fluid also during expansion, and heat removed from the said first fluid during compression. Further, the use of said working fluid heat exchanger tends to reduce the required rotor speeds thus reducing the overall cost of the turbine.

DESCRIPTION OF PREFERRED EMBODIMENTS

Figure 1:
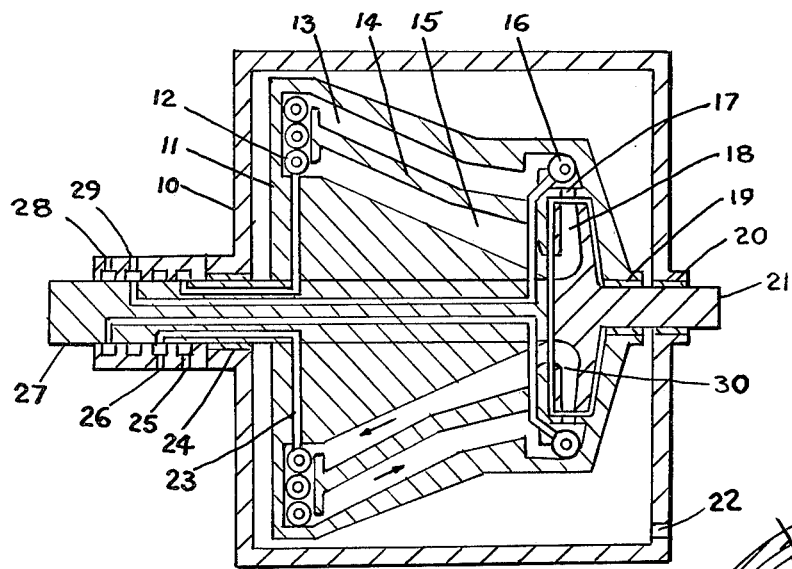
FIG. 1 is a cross section of one form of the turbine, using two rotors and a closed cycle.

Referring to FIG. 1, 10 is casing, 11 is first rotor, 12 is third fluid heat exchanger wherein a third fluid is being circulated in heat exchange relationship with said first fluid to remove heat from the first fluid, 13, 14 and 15 form said working fluid heat exchanger wherein first fluid passes from said third fluid heat exchanger through passage 13 filled with heat exchange members such as fins or vanes, and has heat added to it from returning first fluid flowing in passage 15 also filled with heat exchange members; 14 forming a wall between the two first fluid streams with wall 14 and the fins or vanes being all heat conductive so as to transfer heat from the passage 15 to passage 13. 16 is a second fluid heat exchanger for adding heat into said first fluid, 17 are first fluid nozzles discharging the first fluid forward in the direction of rotation, 18 is second rotor, 19 is shaft seal for second rotor shaft 21, 20 is seal and bearing, 30 are second rotor vanes, 22 is casing vent into which a vacuum source may be connected, 23 is third fluid conduit, 24 is bearing and seal, 25 and 26 are third fluid entry and exit, 27 is first rotor shaft, and 28 and 29 are third fluid entry and exit.

Figure 2:
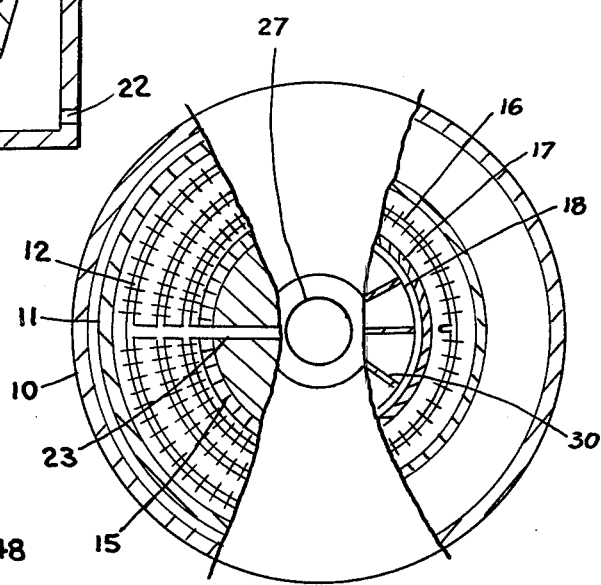
FIG. 2 is an end view of the unit of FIG. 1.

In FIG. 2, the unit of FIG. 1 is shown in end view with portions removed to show interior details. 16 is second fluid heat exchanger, 17 are nozzles, 18 second rotor, 30 second rotor vanes, 23 third fluid distribution conduit, 10 casing, 11 first rotor, 12 third fluid heat exchanger and 27 first rotor shaft, 15 first fluid heat exchanger fins.

Figure 3:
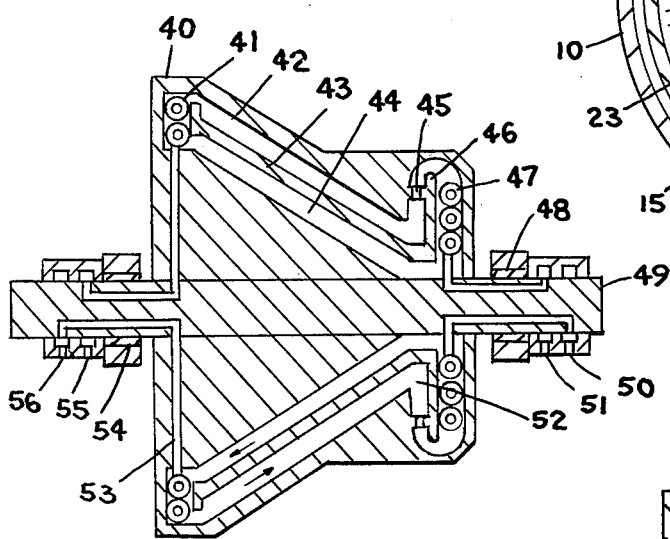
In FIG. 3, another form of the turbine is shown in a cross section using a single rotor.

In FIG. 3, another form of the turbine is shown, arranged for a single rotor to compress and expand said first fluid. 40 is rotor, 41 is third fluid heat exchanger for adding heat to first fluid, 42, 43 and 44 form the working fluid heat exchanger, 45 are first fluid nozzles discharging forward in the direction of rotor rotation, 46 is divider wall, 47 is second fluid heat exchanger, 48 is shaft bearing for supporting rotor shaft, 49 is rotor shaft, 50 and 51 are second fluid entry and exit, 52 are vanes, 53 is third fluid distribution conduit, 54 is shaft bearing, 55 and 56 are third fluid entry and exit.

Figure 4:
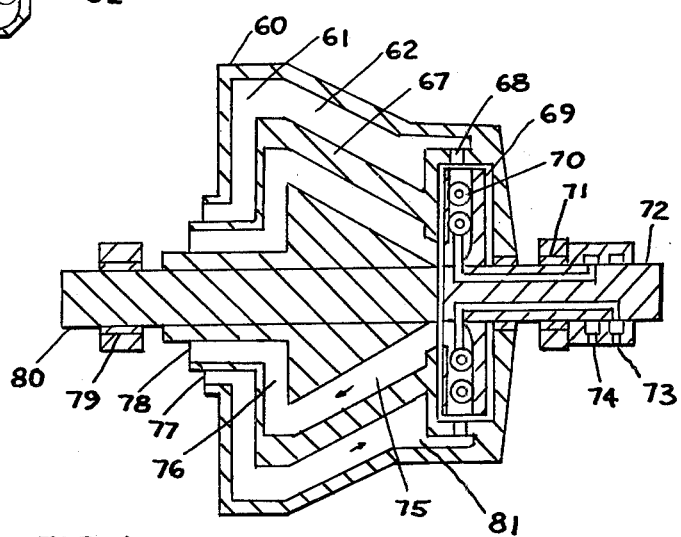
In FIG. 4, a cross section of a unit using an open cycle with two rotors is shown.

In FIG. 4, a form of the turbine is shown where the first fluid enters from outside the rotor and is discharged to outside, and there is thus no need for third fluid. 60 is rotor, 61 is vane, 62,67 and 75 form the working fluid heat exchanger, 68 are rotor nozzles discharging first fluid forward, 69 is second rotor, 70 is second fluid heat exchanger for adding heat to first fluid, 71 is rotor shaft bearing, 72 is second rotor shaft, 73 and 74 are second fluid entry and exit, 81 indicates an area within rotor, this area is discussed hereinafter, 76 are vanes, 77 is first fluid entry, 78 is first fluid exit, 79 is shaft bearing and 80 is first rotor shaft.

Figure 5:
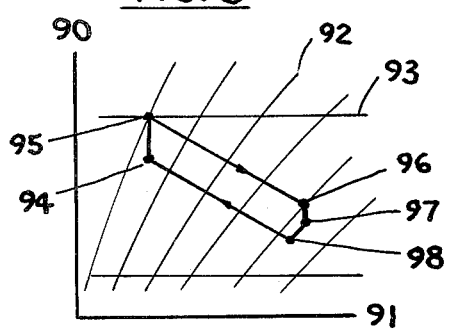
In FIG. 5, a pressure-enthalpy diagram is shown for a typical closed cycle turbine of this invention.

In FIG. 5, a pressure-enthalpy diagram for a typical turbine of this invention is shown. 90 is pressure line and 91 is enthalpy line, 92 are constant entropy lines and 93 are constant pressure lines. The first fluid cycle is illustrated by lines 94-95-96-97-98-94. Line 94-95 is compression, 95-96 is expansion with heat addition, lines 96-97-98 are expansion, and line 98-94 is compression with heat removal. Lines 95-96 and 98-94 are shown to approximately parallel, but this is not always the case, those lines may be set to be non-parallel if desired for the first fluid being used. Also, lines 94-95 and 96-97 may be away from the vertical if desired. The pressure-enthalpy diagram of FIG. 5 is intented to be an approximation for such diagram for the unit shown in FIG. 1, and is provided in herein to help illustrate the process for the first fluid within a turbine of this type.

In operation, a first fluid within the rotor is compressed with heat removal, with the heat being removed being passed into the same first fluid after cooling. The first fluid is then expanded with heat addition with the heat coming from said first fluid removal, and more heat is then added from a second fluid or other heat source, in a heat eddition heat exchanger, herein called the second fluid heat exchanger. Said first fluid is then expanded in a work output section of the turbine to generate said power. After such expansion, the first fluid is passed to be again compressed thus completing the cycle. In the form of FIG. 4, first fluid is received from external sources, and no third fluid heat removal heat exchanger is needed. In the forms shown in FIG. 1 and FIG. 3, a heat removal heat exchanger is provided to restore the first fluid to predetermined temperature before entering said working fluid heat exchanger.

As shown in the drawings, the second fluid heat exchanger may be placed in various locations depending on the design of the rotors. In the area 81, as shown in FIG. 4, the second fluid heat exchanger may be placed to be in the first fluid stream during compression, during expansion, at constant pressure or all these. The size of the heat exchanger varies depending of the requirements for amount of heat transferred, and often it is necessary to fill all the space with the heat exchanger to get enough heat exchanger surface area. Similarly, the heat exchanger 12 may be required to fill some of the spaces of the heat exchange passages 13 or 15 or both.

The form of the turbine, but without the said working fluid heat exchanger, was the subject of a previous U.S. Pat. No. 3,834,179, this referring to the type shown in FIG. 1; and the form shown in FIG. 3, but without the said working fluid heat exchanger, was the subject of another U.S. Pat. No. 3,861,147.

It should be noted, as shown in FIG. 5, that in many instances, the cooling in this turbine occurs at a higher pressure than the heat addition, this refers to the placement of heat exchangers 12 and 16 shown in FIG. 1. This is in direct opposition to normally found present-day commercial practice where the cooling occurs in the lowest working fluid cycle pressure, and heat is added at a higher pressure. By arranging the turbine as shown in the drawings of this invention, the thermal efficiency of the unit is improved thus making it possible to generate more power for a predetermined amount of heat. It should be also noted, that centrifugal force is employed to obtain the needed pressure changes within the rotor. Also, in the turbine of the form shown in FIG. 1, work is required to compress the first fluid from point 98 to point 95 of FIG. 5, but work is received by the first rotor from point 95 to 97 of FIG. 5, so that very little, if any, work is needed to be transferred from the second rotor 18 into first rotor 11. Thus, nearly all of the work produced by second rotor 18 can be used to drive a load. Normally, the two rotors 11 and 18 are connected by suitable power transmission means to maintain proper speed differential of the two rotors; such power transmission means is not mandatory.

The working fluid heat exchanger may be built as shown in the drawings, with a heat conductive substance, such a metal, being used to transport the heat. Other forms of heat exchangers may be used, such as a fluid being circulated within finned tubing between the two passages 13 and 15, FIG. 1. Also, heat pipes may be used placed so that one end of the heat pipe is in passage 13 and another end is in passage 15. Further, the first fluid may be passed in heat exchange using suitable sheet metal convoluted surfaces so that the two first fluid streams are on opposite sides of such sheet metal. Normally, the temperature of first fluid being compressed is being reduced while the temperature of first fluid being expanded in being increased, while within said working fluid heat exchanger.

The second fluid heat exchanger may be deleted, if some other means for adding heat into said first fluid is used in place of said second fluid heat exchanger. In particular, heat addition may be from an adjoining heat pump, if desired, by using some suitable heat exchanger arrangements. Thus, the use of a second fluid within this turbine is not mandatory for a workable turbine.

Various controls are used with the turbine of this invention. They do not form a part of this invention and are not further described herein.

The first fluid used with this turbine is ordinarily a compressible fluid. The second fluid may be ither compressible or noncompressible. The third fluid also may be either compressible or non-compressible. Typical first fluid is carbon dioxide, and typical second and third fluids are water. For the open form of FIG. 4, air can be used as said first fluid, if desired.

In the various first fluid passages, vanes or fins are provided to ensure that said first fluid will rotate with the rotors. These vanes may be either radial or curved, and the fins may also be curved if desired for better performance. The vanes or fins may not be continuous through the entire length of the first fluid passages, depending on design.

I claim:

1. In a turbine for generating power wherein a shaft is mounted for rotation and a rotor is mounted on said shaft so as to rotate in unison therewith, with said rotor having a first outward extending passage and a second outward extending passage with a passage means for connecting said outward extending passages for circulation of a first fluid, said first fluid being compressed within said first outward extending passage by centrifugal force and said first fluid being expanded within said second outward extending passages, said rotor having nozzles for accelerating said first fluid, said rotor having a heat addition heat exchanger for adding heat into said first fluid located upstream of said nozzles, the improvement comprising:

a. a working fluid heat exchanger with a first passage for said first fluid and connecting with said first outward extending passage for removal of heat from said first fluid during its compression, a second passage for said first fluid and connecting with said second outward extending passage for adding heat into said first fluid, with the heat being removed within said first passage being the heat that is being added within said second passage.

2. The turbine of claim 1 wherein said turbine is provided with a second rotor wherein a portion of said second outward extending passages are located within said second rotor.

3. The turbine of claim 1 wherein said turbine is provided with a second rotor wherein said second outward passages are within said second rotor.

* * * * *